United States Patent
Nonaka et al.

(10) Patent No.: US 7,982,787 B2
(45) Date of Patent: Jul. 19, 2011

(54) IMAGE APPARATUS AND METHOD AND PROGRAM FOR PRODUCING INTERPOLATION SIGNAL

(75) Inventors: Yuichi Nonaka, Yokohama (JP); Akihito Nishizawa, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/632,399

(22) Filed: Dec. 7, 2009

(65) Prior Publication Data

US 2010/0085449 A1 Apr. 8, 2010

Related U.S. Application Data

(63) Continuation of application No. 11/129,707, filed on May 13, 2005, now Pat. No. 7,643,073.

(30) Foreign Application Priority Data

Oct. 22, 2004 (JP) ................................ 2004-307586

(51) Int. Cl.
*H04N 5/335* (2006.01)
(52) U.S. Cl. ........................................ 348/272; 348/278
(58) Field of Classification Search .............. 348/222.1, 348/272–274, 278
See application file for complete search history.

(56) References Cited

U.S. PATENT DOCUMENTS

| 5,333,055 | A  | * | 7/1994  | Murata et al. ................ 348/239 |
| 6,426,773 | B1 |   | 7/2002  | Suzuki |
| 6,469,290 | B1 |   | 10/2002 | Suzuki |
| 6,570,616 | B1 | * | 5/2003  | Chen ............................ 348/272 |
| 2005/0058361 | A1 | | 3/2005  | Tajima |

FOREIGN PATENT DOCUMENTS

| JP | 06-178307 | 6/1994 |
| JP | 06-245106 | 9/1994 |
| JP | 11-220745 | 8/1999 |
| JP | 11-220749 | 8/1999 |

* cited by examiner

*Primary Examiner* — Tuan Ho
(74) *Attorney, Agent, or Firm* — Kilpatrick Townsend & Stockton LLP (57) ABSTRACT

An image apparatus has signal slicing unit for two-dimensionally slicing a signal from an imaging device; pixel correlation detection unit for detecting correlation between a center pixel of the signal sliced by the signal slicing unit and its peripheral pixels; correction unit for executing a correction processing for each pixel signal sliced on the basis of the degree of correlation; and synchronization unit for extracting each color signal at the center pixel position of the area sliced by using a signal after correction.

4 Claims, 7 Drawing Sheets

FIG.1

PRIOR ART

FIG.2

PRIOR ART

FIG.9

IMAGE APPARATUS AND METHOD AND PROGRAM FOR PRODUCING INTERPOLATION SIGNAL

CROSS-REFERENCE TO RELATED APPLICATION(S)

This is a continuation of U.S. patent application Ser. No. 11/129,707, filed May 13, 2005, which application claims priority from Japan Patent Application No. JP2004-307586, filed Oct. 22, 2004, the content of which is hereby incorporated by reference into this application.

BACKGROUND OF THE INVENTION

1. Field of the Invention

The present invention relates to an image apparatus having an imaging device constituted by a plurality of color filters having different spectral sensitivities. More particularly, the invention relates to a method for suppressing leak-in of false signals when color imaging is made. In other words, the invention relates to a method for suppressing loop-back noise of a high frequency and moiré signals.

2. Description of the Related Art

JP-A-11-220745 can be cited as a prior art reference disclosing a technology related with the present application. This reference is directed to prevent the "occurrence of false colors by unit of a correlation value for weighting even when noise resulting from CCD, etc, exists in interpolation pixel data" (Summary) and "to acquire interpolation pixel data by applying weighting by the interpolation value" (Unit for Solving the Problems).

Another prior art related with the present application is JP-A-11-220749 and referential technologies are described in Japanese Patents Nos. 3,288,776 and 3,292,533.

SUMMARY OF THE INVENTION

It is an object of the invention to accomplish an image apparatus capable of acquiring excellent image quality.

This object can be accomplished by the inventions described in the scope of claim for patent.

An image apparatus having an imaging device to which a plurality of color filters having different spectral sensitivities is arranged in a pixel unit requires a synchronization processing for extracting each color signal for each pixel of an output signal of the imaging device. Each color signal for one pixel is extracted by interpolating each color filter through a spatial filter having a certain coefficient by use of its peripheral pixels. In this instance, an edge component exists inside a spatial filter range for generating an interpolation signal and when a drastic change of the signal occurs, false signals leak into the resulting interpolation signal. Particularly in the case of an imaging device to which color filters having different spectral sensitivities are arranged in a pixel unit, the degree of leak-in of the false signals varies during the generation of the interpolation signal because a sampling position of each color filter is different.

Figure 1:
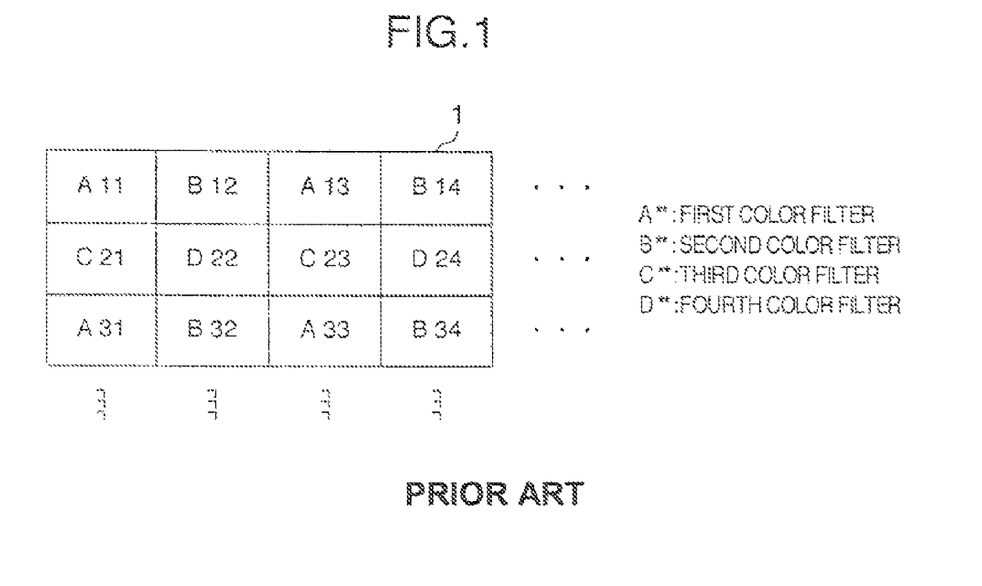
FIG. 1 shows an arrangement example of color filters of an imaging device in an image apparatus.
Figure 2:
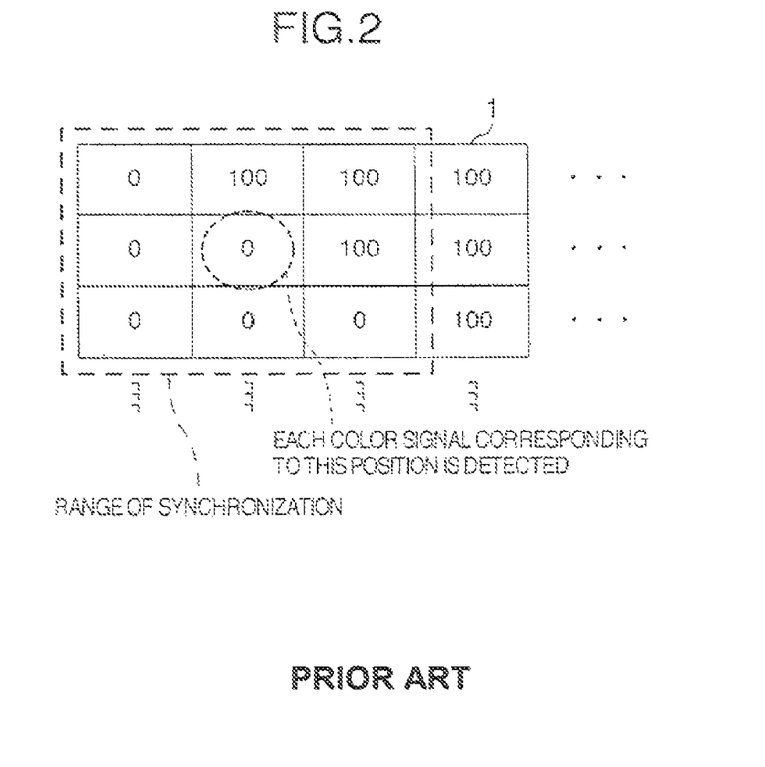
FIG. 2 shows an example of a synchronization processing.

FIG. 1 shows an imaging device to which color filters having four kinds (A to D) of spectral sensitivities are arranged in a pixel unit, for example. FIG. 2 shows an output value from the imaging device when a certain specific subject is imaged. It will be assumed hereby that portions having an output 0 represent a black subject and portions having an output 100 represent a white subject. Assuming that a range of a spatial filter when an interpolation pixel signal is generated is a portion indicated by dotted line in FIG. 2, an extraction result of each color signal at a position of a pixel D22 is as follows:

$A'22 = (A11+A13+A31+A33)/4$ $B'22 = (B12+B32)/2$ $C'22 = (C21+C23)/2$ $D'22 = D22$

When the subject shown in FIG. 2 is imaged, each interpolation signal is as follows:

$A'22 = (0+100+0+0)/4 = 25$ $B'22 = (100+0)/2 = 50$ $C'22 = (0+100)/2 = 50$ $D' = 0 = 0$

Because the position D22 is originally the position of the black subject, the theoretical value of each color signal output is 0. When the interpolation signals A to D are generated in this case, false signals leak into each signal and the proportion of the leaking false signals is different, too.

The image apparatus applies a signal processing by using this interpolation signal and generates each color signal of RGB or a color difference signal. Therefore, a false color develops depending on the quantity of the false signals leaking into each color signal after extraction and on the difference of leak-in of the false signals to each color signal extracted.

One of the methods of reducing this false color is unit that suppresses leak-in of the false signals at the time of generation of the interpolation signal. There is a method that detects a degree of correlation in both vertical and horizontal directions, for example, selects the direction having a higher degree of correlation and generates an interpolation pixel signal. The term "pixel signal having low correlation" unit those pixel signals which may highly possibly result in leak-in of the false signals and the term "pixel signal having high correlation" unit those pixel signals which have a low possibility of resulting in leak-in of the false signals. Because this method selects the pixel signal having a low possibility of leak-in of false colors and generates the interpolation signal, the occurrence of the false color can be suppressed. When a position having a high degree of correlation can be detected as a pattern of [C21, D22, A31, B32] in the case of FIG. 2, it is possible to prevent leak-in of the false signals when the following condition is satisfied:

$A'22 = A31 = 0$ $B'22 = B32 = 0$ $C'22 = C21 = 0$ $D'22 = D22 = 0$

There remains the problem that the suppression effect cannot be expected for the false signals exceeding a frequency band in which correlation can be detected because leak-in of the false signals is suppressed during the generation of the interpolation signal, and erroneous detection, if any, stresses the false color, on the contrary. When the number of patterns of the pixel selection method used for interpolation is increased, a more suitable pattern can be selected. However, when this method is realized through a hardware construction, the circuit scale increases and when it is realized through a software construction, a control flow gets complicated.

The technology described in the prior art reference 1 involves the problem that a processing changes depending on the arrangement of each color filter of a sensor because a correlation value corresponding to a signal G having a high frequency component in the RGB Bayer arrangement is calculated, for example.

The invention can acquire excellent image quality and can improve easiness-to-use of the image apparatus.

Other objects, features and advantages of the invention will become apparent from the following description of the embodiments of the invention taken in conjunction with the accompanying drawings.

DESCRIPTION OF THE EMBODIMENTS

Preferred embodiments of the invention will be explained with reference to the accompanying drawings.

Figure 3:
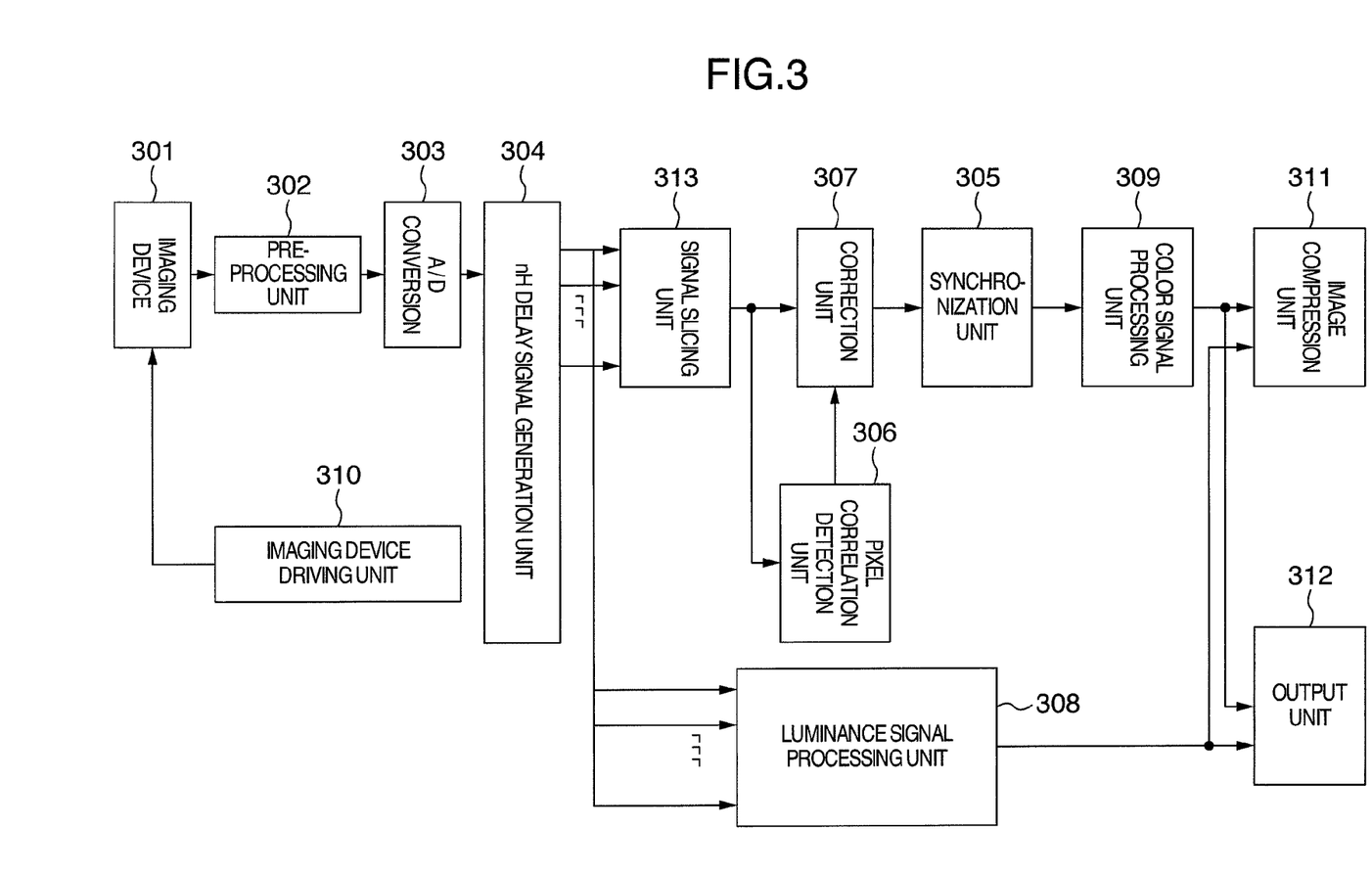
FIG. 3 is a block structural view of the image apparatus in Example 1.

FIG. 3 is a block structural view of an image apparatus according to Example 1 of the invention. Reference numeral 301 denotes an imaging device. Reference numeral 302 denotes a pre-processing unit. Reference numeral 303 denotes an A/D conversion unit. Reference numeral 304 denotes an nH delay signal generation unit. Reference numeral 305 denotes synchronization unit. Reference numeral 306 denotes pixel correlation detection unit. Reference numeral 307 denotes correction unit. Reference numeral 308 denotes luminance signal processing unit. Reference numeral 309 denotes color signal generation unit. Reference numeral 310 denotes imaging device driving unit. Reference numeral 311 denotes image compression unit. Reference numeral 312 denotes output unit. Reference numeral 313 denotes signal slicing unit.

A plurality of color filters having mutually different spectral sensitivities is arranged on the imaging device 301 driven by the imaging device driving unit 310. The imaging device 301 photo-electrically converts an image of a subject imaged on an imaging surface and outputs the image as an electric signal. The imaging device 301 serially reads out each pixel in a horizontal direction. The imaging device may have a construction that uses a multi-plate type imaging device in place of a mono-plate type imaging device and employs a method for generating a signal arrangement equivalent to the output of the mono-plate type imaging device by processing the output from the multi-plate type imaging device.

The pre-processing unit 302 removes noise from the electric signal so read out and controls its gain. The A/D conversion unit 303 converts the signal to a digital signal. Incidentally, the pre-processing portion 302 may have a construction that executes the processing for the digital signal after A/D conversion.

The n (n: constant)H delay unit 304 generates an original signal, a 1H delay signal obtained by delaying the original signal by 1H, a 2H delay signal obtained by further delaying the 1H delay signal and delaying subsequently and similarly an nH delay signal from the output of the imaging device converted to the digital signal.

The luminance signal processing unit 308 generates a luminance signal corresponding to each pixel on the basis of the digital signal generated by this nH delay signal generation unit.

Figure 7:
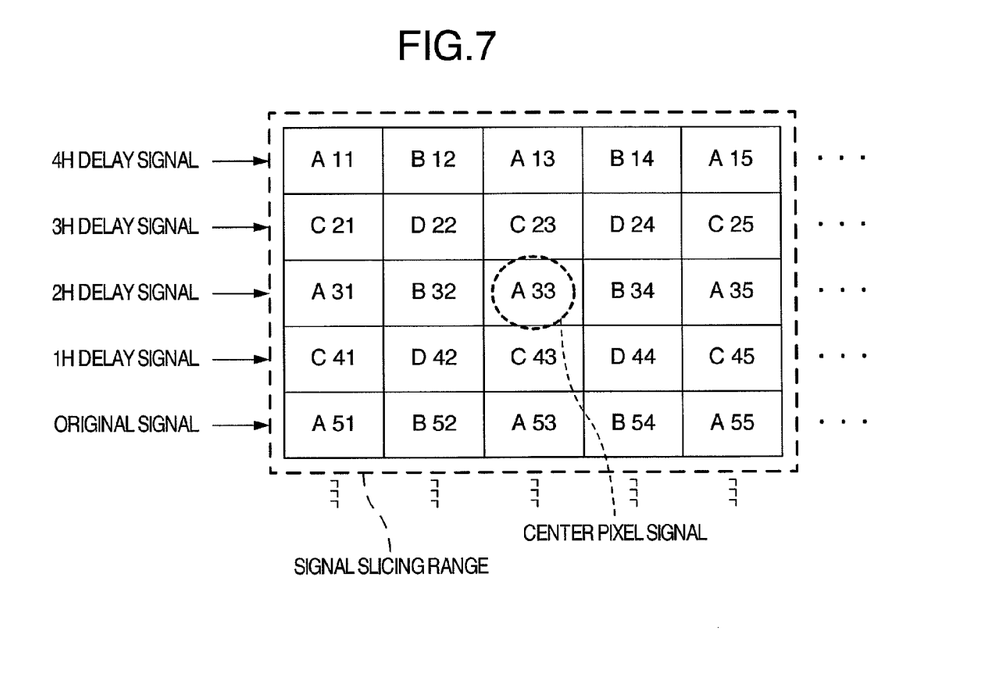
FIG. 7 shows an example of pixel signal slicing by signal slicing unit in the image apparatus.

FIG. 7 shows a range of signals to be sliced by the signal slicing unit 313 when the horizontal scan period delayed by the nH delay signal generation unit is set to n=4. The signal slicing unit 313 simultaneously slices a certain center pixel signal and peripheral pixel signals around the former into y pixels in a vertical scan direction and x pixels in a horizontal scan direction for the signals corresponding to the pixels of color filters A to D arranged on the imaging device 301. The range indicated by dotted line in FIG. 7 represents the signal slicing range when x=5 and y=5 with the pixel A33 as the center. The signal slicing unit 313 serially executes the signal slicing processing for each pixel. The subsequent correction unit 307 and pixel correlation detection unit 306 execute processing for the signals sliced by the signal slicing unit 313.

The pixel correlation detection unit 306 detects a degree of correlation of the center pixel signal of the signal sliced by the signal slicing unit 313 with the signals of the peripheral pixels similarly sliced.

Figure 8:
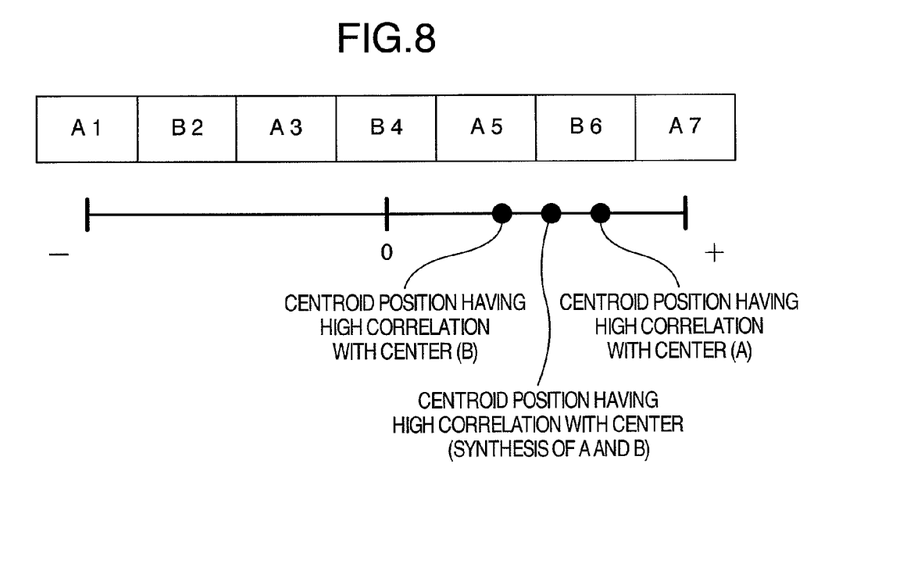
FIG. 8 shows an example of a correlation detection method by pixel correlation detection unit in Examples 1 to 4.

FIG. 8 shows an example of a correlation detection method in the pixel correlation detection unit. Assuming that the pixel B4 in FIG. 8 takes the center position, the centroid position of the pixel B having high correlation with the center pixel is first calculated. Correlation is judged as high when the signal level of the pixel B2 has no difference from the center pixel B4 and as low when the signal level has the difference. This also holds true of B6. In other words, the centroid position of the pixel B hereby calculated is determined for the centroid position that shifts in the direction of B2 when B2 has higher correlation and the centroid position that shifts in the direction of B6 when B6 has higher correlation, by using the difference value. This can be accomplished by using the following equation.

Centroid position=|B4−B2|−|B4−B6|

According to this formula, the smaller the difference between the center B4 and B2 (correlation of B2 is higher), the more the centroid position shifts towards B2, and the smaller the difference between B4 and B6 (correlation of B6 is higher), the centroid position shifts towards B6.

The synchronization unit generates an interpolation signal that suppresses leak-in of a false signal by using the centroid position calculated by the formula described above. This can be achieved by using the following formula, for example.

Interpolation signal of B=B2×0.25−B2×a×centroid position    (1)

B4×0.5    (2)

+B6×0.25+B6×a×centroid position    (3)

2×(0.25−a×centroid position)

B4×0.5

B6×(0.25+a×centroid position)

(where a: constant)

Incidentally, (−B2×a×centroid position) in (1) and (+B6× a×centroid position) in (3) are the values of the correction signals corrected by the correction unit 307. Therefore, a coefficient of a filter of the synchronization unit 305 can be fixed. Here, B2 and B6 can be fixed to coefficients of 0.25 and 0.5, respectively, to obtain the interpolation signal of B at the position B4.

According to this formula, the higher the correlation of B6 and the greater the shift of the centroid position value of the pixel B towards the positive side, the greater becomes the coefficient for B6 and the smaller becomes the coefficient for B2. On the other hand, the higher the correlation of B2 and the greater the shift of the centroid position value of the pixel B towards the negative side, the smaller becomes the coefficient for B6 and the greater becomes the coefficient for B2. Consequently, the gain of the pixel having low correlation that may result in leak-in of the false signal can be reduced.

Assuming that the correlation is low such as the edge portion and the output values of B2, B4 and B6 from the imaging device are 0, 100 and 100, respectively, it is possible to suppress the false signal leaking into the interpolation signal of B when the coefficient for B6 in (3) is set to 0, but another problem occurs in that a circuit scale increases in the hardware construction when coefficients matching with a large number of patterns are prepared. According to the embodiment of the invention, on the other hand, the circuit scale can be simplified because it is necessary to only add the circuit for multiplying the centroid position and the software processing can be facilitated.

Similarly, the interpolation signal of A can be acquired.

For example, the interpolation signal of A can be acquired in accordance with the following formula.

$$\text{Interpolation signal of } A = A1 \times (0.125 - b \times \text{centroid position}) + A3 \times (0.375 - c \times \text{centroid position}) + A5 \times (0.375 + c \times \text{centroid position}) + A7 \times (0.125 + b \times \text{centroid position})$$

The centroid position of the pixel A is determined, too. The centroid position can be calculated by using the following formula, for example.

$$\text{Centroid position} = |A3 - A1| - |A5 - A7|$$

The position having high correlation with the center pixel can be detected by calculating the mean value of the centroid positions of the pixels A and B and by using both pixels A and B. Consequently, detection of correlation about a higher frequency component that cannot be obtained by using the centroid position of the pixel B alone can be made.

When the centroid positions individually calculated are used when the interpolation signals of A and B are generated, the centroid positions become greatly different at a frequency at which loop-back of signals occur and the occurrence of loop-back of the signals is stressed. This problem can be suppressed when the interpolation signal of each of A and B is generated by using in common the synthetic values of the centroid positions of A and B.

In this case, the centroid position of the pixel A may be a signal that is generated by interpolation without using the original signal in accordance with the same formula for calculating the centroid position of the pixel B. In the calculation of the centroid positions of A and B, the number of pixels is 4 for A and 3 for B but this is not restrictive, in particular, and the number of pixels may well be plural for each of A and B. The centroid position may also be calculated from the result of the filter processing using a predetermined coefficient without using the difference value.

Correlation can be detected in all imaging devices without depending on the difference of the arrangement of the color filters when the method that calculates the centroid position for each color of the filter and synthesize the centroid positions is employed. Alternatively, in the case of an imaging device 301 having a Bayer arrangement in which the first and fourth color filters have the same spectral characteristics, the first or fourth color signal at the positions of the second and third color filters is interpolated and the signals of the same color are acquired at all the pixel positions. When the centroid position is calculated by using this signal, correlation can be detected with the signal having a higher frequency component among the color signals of the Bayer arrangement, and correlation having high frequency characteristics can be detected.

Figure 9:
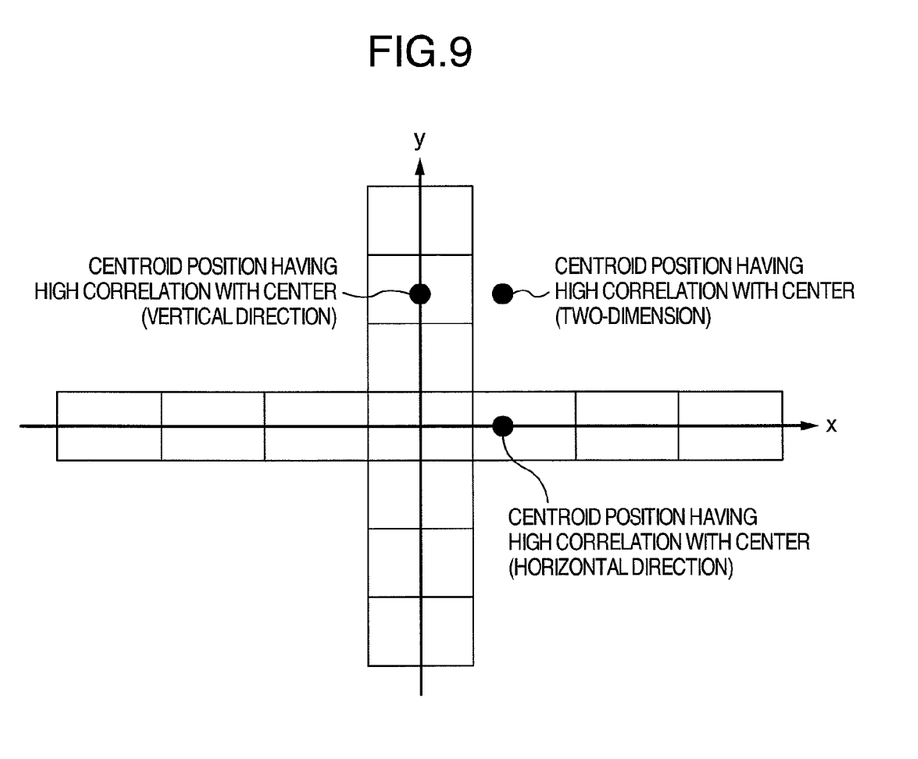
FIG. 9 shows an example of a correlation detection method by pixel correlation detection unit in Examples 1 to 4.

Correlation of a high frequency can be detected by generating a luminance signal from each pixel signal from the imaging device 301 and calculating the centroid position by using this luminance signal. FIG. 9 shows an example of a correlation detection method of a two-dimensional area in the pixel correlation detection unit. The centroid position (x, y) in the two-dimension is calculated by calculating the centroid position x of the pixel signal in the horizontal direction and its centroid position in the vertical direction. It is also possible to employ at this time a method that calculates not only the centroid position (x, y) but also uses all the peripheral pixel signals.

The correction unit 307 executes the correction processing for those signals that are sliced by the signal slicing unit 313 on the basis of the degree of correlation detected by the correlation detection unit 306. This correction processing is the one that lowers the output for those pixel signals having a low degree of correlation, raises the output for those pixel signals having a high degree of correlation and adjusts the output of the synchronization unit 305 executing the synchronization processing by use of this correction processing to a constant level.

The synchronization unit 305 is the unit that extracts each color signal for the center pixel position. It will be assumed that interpolation color signals A' to D' for the center pixel A33 are generated in FIG. 7. When this interpolation signal is generated, it is generated by using a predetermined fixed coefficient.

According to the constructions of these signal slicing unit 313, correction unit 307, pixel correlation detection unit 306 and synchronization unit 305, it is possible to improve a contribution ratio of pixel signals having a higher degree of correlation and to lower the contribution ratio of pixel signals having a lower degree of correlation, and to suppress the occurrence of the false colors by decreasing leak-in of the false signals. Lowering of the contribution ratio of the pixels having a lower degree of correlation that may invite the drop of the frequency of resolution used for extracting the color signals provides the effect of improving resolution for the color signals.

Because this example can fix the coefficient of the synchronization unit 305, the construction of the synchronization unit 305 can be simplified.

Example 2

Figure 4:
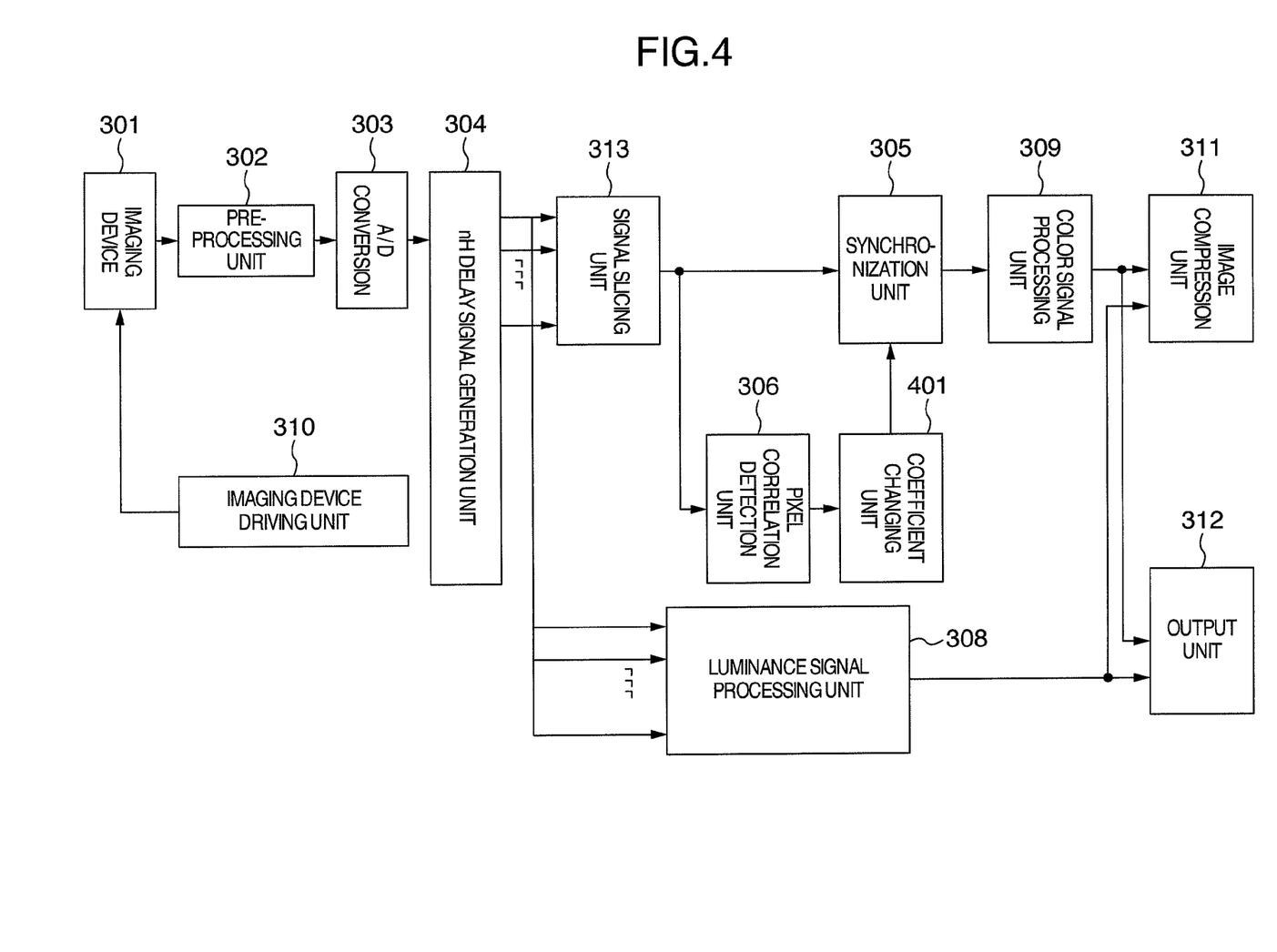
FIG. 4 is a block structural view of the image apparatus in Example 2.

FIG. 4 is a block structural view of an image apparatus in Example 2 of the invention. The image apparatus has coefficient changing unit 401 in place of the correction unit 307 in Example 1.

The luminance signal processing unit 308 generates the luminance signal corresponding to each pixel on the basis of the digital signal from the nH delay signal generation unit 304.

The signal slicing unit 313 serially executes the signal slicing processing for slicing the two-dimensional area of the digital signal from the nH delay signal generation unit.

The pixel correlation detection unit 306 detects the degree of correlation of the center pixel signal of the signal sliced by the signal slicing unit 313 with the signal of the peripheral pixel similarly sliced. This degree of correlation detects the centroid position analogous to that of the pixel correlation detection unit 306 in Example 1.

The coefficient changing unit 401 changes the coefficient used for generating the interpolation signal in the synchronization unit 305 on the basis of the degree of correlation detected by the pixel correlation detection unit 306. The change of the coefficient raises the coefficient for the pixel signal detected when the degree of correlation is high, and lowers the coefficient for the pixel when the degree of correlation is low so that the gain of the synchronization unit 305 becomes constant. For example, a plurality of patterns of coefficients is prepared by the interpolation signal generation method in Example 1 and is changed in accordance with the degree of correlation.

According to the constructions of these signal slicing unit 313, pixel correlation detection unit 306, coefficient changing unit 401 and synchronization unit 305, it is possible to improve a contribution ratio of pixel signals having a higher degree of correlation and to lower the contribution ratio of pixel signals having a lower degree of correlation, and to suppress the occurrence of the false color by decreasing leak-in of the false signal.

Example 3

Figure 5:
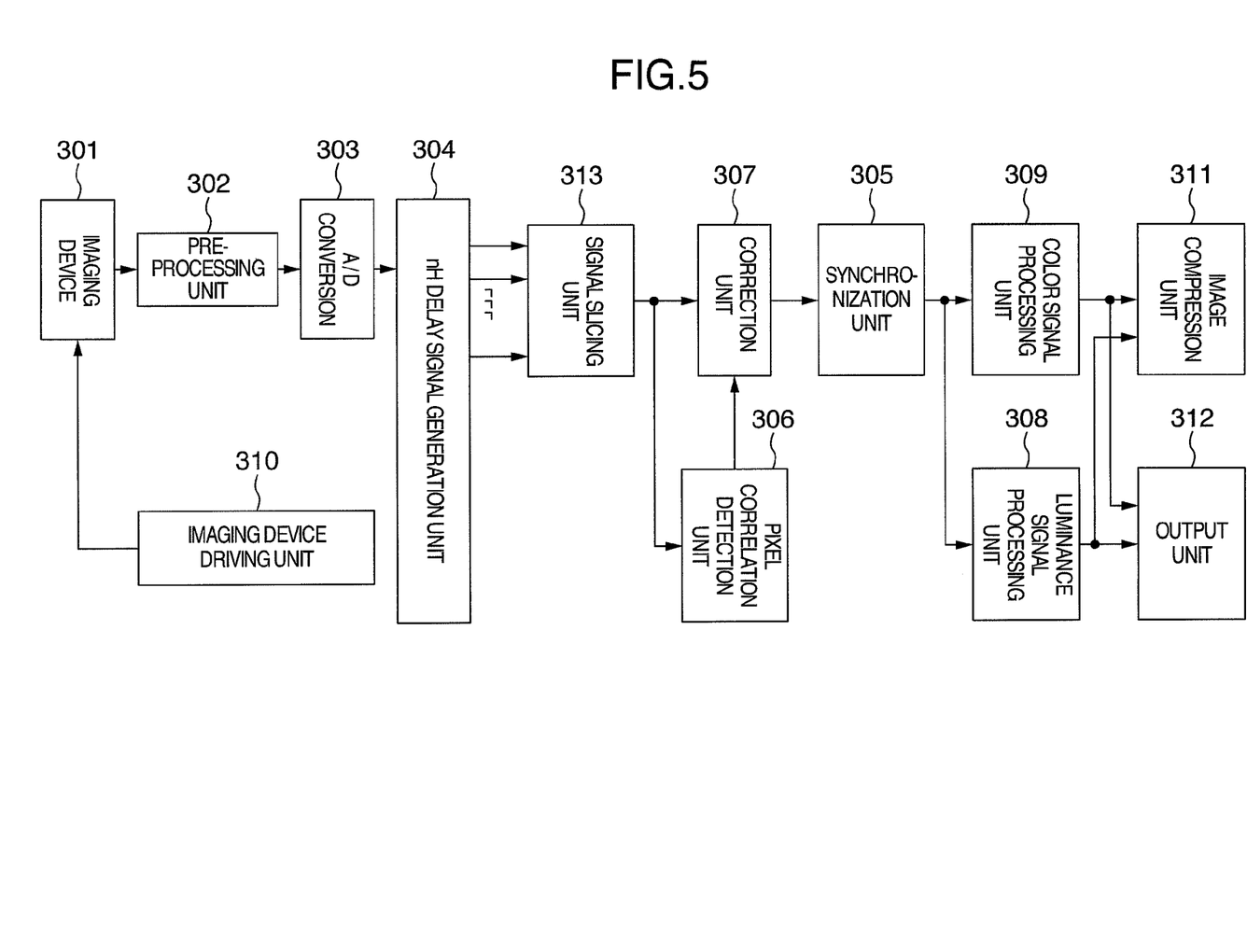
FIG. 5 is a block structural view of the image apparatus in Example 3.

FIG. 5 is a block structural view of an image apparatus in Example 3 of the invention. The luminance signal processing unit 308 in Example 1 or 2 inputs the output signal of the synchronization unit 305 in place of the output signal of the nH delay signal generation unit and generates the luminance signal.

The synchronization unit 305 extracts each color signal by the method in Example 1 or 2. The luminance signal processing unit 308 executes the arithmetic processing by using each color signal extracted by the synchronization unit 305 and generates the luminance signal.

This construction can suppress leak-in of the false signals that may result in luminance moiré for each color signal used for generating the luminance signal and can acquire excellent image quality with less luminance moiré. This construction can improve resolution for the luminance signal by lowering the contribution ratio of those pixels having a low degree of correlation that may result in the drop of the frequency of resolution.

Example 4

Figure 6:
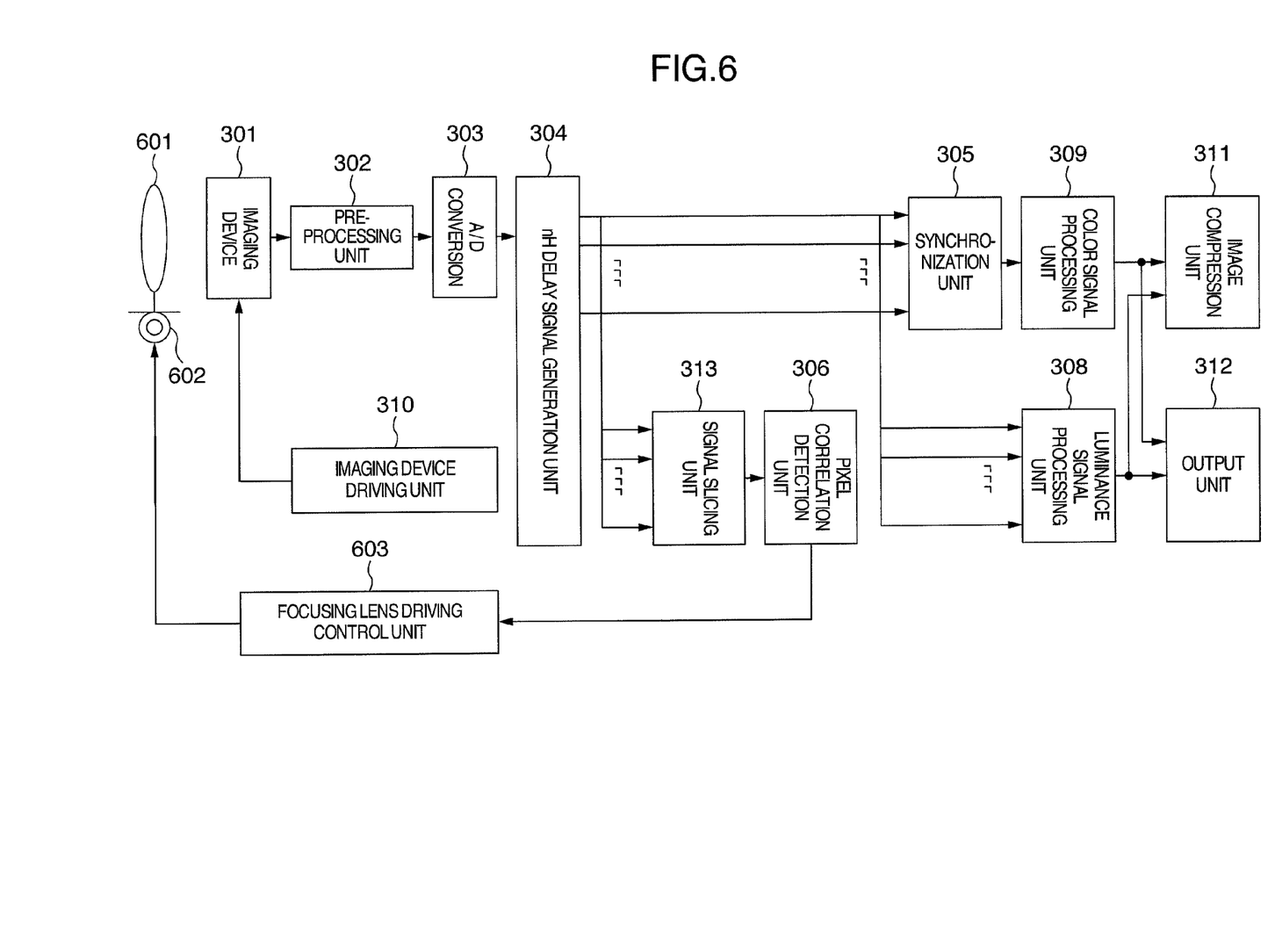
FIG. 6 is a block structural view of the image apparatus in Example 4.

FIG. 6 is a block structural view of an image apparatus in Example 4 of the invention. The image apparatus further includes a focusing lens 601, a focusing lens driving circuit 602 for changing the position of the focusing lens and changing the distance from the imaging surface of the imaging device and focusing lens driving control unit for adjusting the focal length by controlling the focusing lens driving circuit.

The luminance signal processing unit 308 and the color signal processing unit 309 generate the luminance signal and the color signal, respectively, by using the digital signal from the nH delay signal generation unit or the output result of the synchronization unit 305.

The focusing lens driving control unit 603 has the function of detecting the focal point at which the focus can be made on the subject by operating the focusing lens driving circuit 602. This unit 603 further has the function of controlling the focusing lens driving unit 602 to a position spaced apart by a predetermined distance in accordance with information of the degree of correlation of the pixel detected by the pixel correlation detection unit 306 and moving the focusing lens 601. The information of the degree of correlation of the pixel at this time is the degree of correlation of each pixel or an integration value of the degrees of correlation of the pixels, and the lens is moved from the focal point when a large number of pixel signals having a low degree of correlation exist.

According to the construction described above, the image is optically rendered obscure by moving the focusing lens to suppress the high frequency components. Because the false signals have mostly the high frequency components, the synchronization unit can suppress the proportion of leak-in of the false signals to each color signal when each color signal is extracted, and the occurrence of the false colors can thus be reduced.

According to the construction described above, the effect of reducing the false colors of quartz having optical LPF characteristics can be acquired by moving the focusing lens and a compact image apparatus devoid of the quartz can be provided.

According to the examples described above, the contribution ratio of each pixel signal can be changed in accordance with pixel correlation when each color signal is extracted by the synchronization unit, and leak-in of the false signal to each color signal to be extracted can be suppressed. When the color signal is generated on the basis of each color signal having less leak-in of the false signal, excellent image quality with less false colors can be acquired. When the luminance signal is generated on the basis of each color signal having less leak-in of the false signal, excellent image quality having less luminance moiré can be acquired while preventing degradation of resolution.

The synchronization unit can change the contribution ratio of each pixel signal when each color signal is extracted and the difference of the proportion of the false signals leaking into each color signal extracted can be reduced. The occurrence of the false colors and luminance moiré can be reduced and excellent image quality having less false colors can be acquired by moving the focusing position of the lens in accordance with the pixel correlation.

The occurrence of the false colors and luminance moiré can be reduced by moving the focusing position in accordance with the pixel correlation and excellent image quality can be acquired.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An interpolation signal generation method for generating an interpolation signal as each color signal from a signal outputted from an imaging device, comprising the steps of:
    slicing a signal outputted from said imaging device in a two-dimensional area;

detecting correlation between a center pixel signal of the area sliced and peripheral pixel signals of the center pixel signal of the area sliced;

correcting a signal quantity for the pixel signal sliced on the basis of the correlation detected and generating a correlation correction signal;

inputting the signal so sliced into a filter as a fixed coefficient; and generating an interpolation signal by putting together the signal outputted from said signal and the interpolation correction signal.

2. A non-transitory computer readable medium on which recorded is a program capable of being executed by an information processing unit, the program comprising the steps of:

slicing a signal outputted from said imaging device in a two-dimensional area;

detecting correlation between a center pixel signal of the area sliced and peripheral pixel signals of the center pixel signal of the area sliced;

correcting a signal quantity for the pixel signal sliced on the basis of the correlation detected and generating a correlation signal;

inputting the signal so sliced into a filter as a fixed coefficient; and generating an interpolation signal by putting together the signal outputted from said signal and the interpolation correction signal.

3. An interpolation signal generation method for generating an interpolation signal as each color signal from a signal outputted from an imaging device, comprising the steps of:

slicing a signal outputted from said imaging device in a two-dimensional area;

detecting a correlation value between a center pixel signal of the area sliced and peripheral pixel signals of the center pixel signal of the area sliced;

said center pixel signal being a first pixel signal, said peripheral pixel signals being a second pixel signal and a third pixel signal, said second pixel signal, said first pixel signal and said third pixel signal being arranged in this order in a horizontal direction;

multiplying said second pixel signal and said third pixel signal by said correlation value and generating correlation correction signals, respectively, even when output values of said second pixel signal, said first pixel signal and said third pixel signal from said imaging device are 0, 100 and 100, respectively; and generating an interpolation signal on the basis of said interpolation correction signals generated.

4. A non-transitory computer readable medium on which recorded is a program capable of being executed by an information processing unit, the program comprising the steps of:

slicing a signal outputted from said imaging device in a two-dimensional area detecting a correlation value between a center pixel signal of the area sliced and peripheral pixel signals of the center pixel signal of the area sliced;

said center pixel signal being a first pixel signal, said peripheral pixel signals being a second pixel signal and a third pixel signal, said second pixel signal, said first pixel signal and said third pixel signal being arranged in this order in a horizontal direction;

multiplying said second pixel signal and said third pixel signal by said correlation value and generating correlation correction signals, respectively, even when output values of said second pixel signal, said first pixel signal and said third pixel signal from said imaging device are 0, 100 and 100, respectively; and generating an interpolation signal on the basis of said interpolation correction signals generated.

* * * * *